United States Patent [19]
Aberson

[11] Patent Number: 5,515,288
[45] Date of Patent: May 7, 1996

[54] METHOD AND CONTROL APPARATUS FOR GENERATING ANALOG RECURRENT SIGNAL SECURITY DATA FEEDBACK

[76] Inventor: Michael Aberson, Rehov Brener 22/1, Haifa, Israel, 32546

[21] Appl. No.: 77,745

[22] Filed: Jun. 18, 1993

[51] Int. Cl.⁶ .................................................. G06F 3/05
[52] U.S. Cl. .............................. 364/464.01; 364/474.16; 364/575; 340/825.08
[58] Field of Search .................................... 395/575, 650, 395/915; 364/464.01, 474.16, 575; 340/825.06, 825.08

[56] References Cited

PUBLICATIONS

International Standard ISO–9004, International Organization for Standardization p. 7.
"SPC May Really Become Process Control" Control Engrg. Jul. 1988, pp. 83–84.
"Computer–based relays protect distribution system", Elect. World, Jan. 1990/p. 51–52.
"SCADA System Outdated? Upgrade with EMS", Elect. World, Jan. 1990/pp.52–54.

Primary Examiner—Emanuel T. Voeltz
Assistant Examiner—Thomas Peeso
Attorney, Agent, or Firm—Edward Langer

[57] ABSTRACT

A microprocessor-based apparatus provided as a dedicated control unit, which enables a standard software protocol to provide a digital presentation of security criteria associated with stable analog process data relating to recurrent processes in businesses and utilities. The general method introduced here provides security criteria data in two functional control loops: First, the I-criterion provides continuous monitoring of the input analog signal and interruptions thereof, which are presented in time units. Second, the Q-criterion provides the input analog signal conversion in digital form, and identifies the signal quality by determining whether it falls within or deviates from a standard tolerance range. In addition, a stochastic signal decomposition is performed to provide four 6-hour disjoint data files within a behavioristic control loop/each calendar day. The final output document is a rectangular digital format which can be adequately presented in printed or written form, enabling a fast response for local and strategic decision-making, including end user's feedback and use in a capable of standard data highway protocol.

11 Claims, 6 Drawing Sheets

| PARAMETER | $t°C$ (AS AN EXAMPLE) | | | |
|---|---|---|---|---|
| INSTRUMENT | No... | | | |
| CALENDAR DATE | FILES | | | |
| | 0          6          12          18          24HRS | | | |
| | 1 | 2 | 3 | 4 |
| | BLUE | WHITE | GRAY | ROSE |
| 1st DAY | $\dfrac{1i_1}{1(q_>+q_<)_1}$ | $\dfrac{1i_2}{1(q_>+q_<)_2}$ | $\dfrac{1i_3}{1(q_>+q_<)_3}$ | $\dfrac{1i_4}{1(q_>+q_<)_4}$ |
| 2nd DAY | $\dfrac{2i_1}{2(q_>+q_<)_1}$ | $\dfrac{2i_2}{2(q_>+q_<)_2}$ | $\dfrac{2i_3}{2(q_>+q_<)_3}$ | $\dfrac{2i_4}{2(q_>+q_<)_4}$ |
| 3rd DAY | $\dfrac{3i_1}{3(q_>+q_<)_1}$ | $\dfrac{3i_2}{3(q_>+q_<)_2}$ | $\dfrac{3i_3}{3(q_>+q_<)_3}$ | $\dfrac{3i_4}{3(q_>+q_<)_4}$ |
| 4th DAY | $\dfrac{4i_1}{4(q_>+q_<)_1}$ | $\dfrac{4i_2}{4(q_>+q_<)_2}$ | $\dfrac{4i_3}{4(q_>+q_<)_3}$ | $\dfrac{4i_4}{4(q_>+q_<)_4}$ |
| 5th DAY | $\dfrac{5i_1}{5(q_>+q_<)_1}$ | $\dfrac{5i_2}{5(q_>+q_<)_2}$ | $\dfrac{5i_3}{5(q_>+q_<)_3}$ | $\dfrac{5i_4}{5(q_>+q_<)_4}$ |
| .... DAY | $\dfrac{...i_1}{...(q_>+q_<)_1}$ | $\dfrac{...i_2}{...(q_>+q_<)_2}$ | $\dfrac{...i_3}{...(q_>+q_<)_3}$ | $\dfrac{...i_4}{...(q_>+q_<)_4}$ | i (SEC, MIN, HRS):q(1,2,3... PROBES OUT OF RANGE)

FIG.4

METHOD AND CONTROL APPARATUS FOR GENERATING ANALOG RECURRENT SIGNAL SECURITY DATA FEEDBACK

CROSS-REFERENCE TO RELATED APPLICATIONS

The present application is related to two previously filed patent applications by the same inventor, Ser. No. 07/946,093, filed Sep. 17, 1992 entitled METHOD AND CONTROL APPARATUS FOR QUANTITATIVE RESOURCE DATA/DISTRIBUTED AUTOMATION PROTOCOL", and Ser. No. 08/035,699 filed Mar. 23, 1993, entitled "METHOD AND CONTROL APPPARATUS FOR QUALITATIVE ANALOG DATA/DISTRIBUTED AUTOMATION PROTOCOL", the disclosures of which are incorporated herein by reference.

FIELD OF THE INVENTION

The present invention relates to metric data acquisition/processing systems as applied in production and service information technology and to the management field. More specifically, it relates to a distributed microprocessor-based apparatus for presenting the reliability and quality criteria of a recurrent analog process variable in SI metric units (e.g., temperature, voltage, pressure, speed, radiation, vibration, noise, etc.), by sliding mode statistical monitoring/diagnostics and criterial assessment in a standard digital format.

The present invention further relates to instrumentation apparatus for providing sliding mode inspection of individual parameters representing the commercial marketplace equilibrium (e.g., the supply and demand side of electrical utility operation). Individual and group output is completely ready for on-line control and financial assessment, fast and certain decision making, and discrete optimization programming in real-time/object-oriented procedures.

BACKGROUND OF THE INVENTION

Production and service industries are currently under tremendous pressure to become more efficient and productive. Quality control is a central problem in manufacturing process/product/service operating management control and market survival. The classic approach to its development uses available instrumentation, administrative management (standardization, regulation, commission), special operator training within every business unit, and public boards/committees as a demand-side feedback mechanism for essential and consumer commodities.

According to US Quality Forum annual reports, individual end users and customers belong to the silent majority; as a rule, their complaints concern visible failures, but not non-obvious quality standard violations. There are some important quality facets which are beyond an operating manual or customer information booklet.

In advanced industries there are various total quality management and control systems which are mainly based on detailed charts, tables, diagrams, and bureaucratic rules, e.g. E. Deming and M. Baldridge's famous rules which serve as a guide for managers. An international standard for design of quality management systems has been published in ISO-9004, entitled "Quality management and quality system elements—Guidelines", specifically, section 7.3, dealing with customer feedback system on a continuous basis.

There are two general negative features of such well-known "total" quality management programs:

1) the "human factor" in judgement is dominant;
2) an individual customer lacks qualitative objective data for establishing a financial claim for paid-for services.

With regard to modern distributed diagnostic instrumentation, there is a wide gap between expensive up-to-date and sophisticated hardware (highly accurate) and out-of-date metrological software, including that of well-known statistical process control (SPC, as described in the article entitled "SPC May Really Become Process Control", G. Blickley, Control Engineering, July 1988, p. 83–84), which virtually does not work, e.g., steady-state versatile transducers, such as available from Telog, RIS, Metrosonics, etc., which require further PC-oriented processing.

It is a well-known fact that commercial equilibrium in supply and demand sides is hopelessly difficult to achieve in the case of a monopolistic supplier against the ill-defined complaints of an isolated end user.

SUMMARY OF THE INVENTION

Accordingly, it is a principal object of the present invention to overcome the above-mentioned conceptual disadvantages and to provide a control apparatus and method for:

1) a dedicated, automated signal security monitoring system based on general standard software;
2) instrument-based feedback criteria from supply side (product) and demand side (user) in a measurable format; and
3) a standard communication interface/protocol.

Generally, there are two integral criteria of any analog recurrent signal security assessment: 1) reliability and 2) quality.

The first criteria, reliability, relates to the existence of a process output (interruptions and/or a loss of stable operation in time units); and the second criteria, quality, relates to deviations from a standard tolerance range (in statistical ratings of economic operating conditions in SI basic and derived units, e.g., +/−6% $V_N$, etc.).

As a microprocessor-based controller, the apparatus utilizes conventional hardware blocks in combination with common control commands according to the ANSI/IEEE Std. 488-87 (time-schedule controller, two-level timer, A/D converter, comparator, buffer-storage, printing/recording/transmitting modules), which is used for the dedicated individual, but general standard software digital code embodiment.

The inventive control apparatus operates based on five digital parameters:

1) Interruptions: every interruption in time units of a second or greater generates a signal relating to a reliability criterion;
2) Takeoff probe interval: between every measured original signal, there is a standard sample takeoff probe interval of six minutes, introduced for stable low-frequent recurrent (economic) stochastic processes;
3) Excess deviation: if 13 or more signal probes per calendar day indicate an excess deviation, this affects the signal quality statistical level, and provides a digital criterion of quality standard (+/− tolerance) disturbance or deviation. If every signal probe "costs" six minutes in a stable random process (as introduced above), 13 or more probes of excess deviation means that the confidence level of process quality per calendar day is less than standard probability (P=0.95). In other words, the confidence level of a general process quality criterion for any recurrent analog signal, when expressed in terms of disutility (invalid probes), is as follows:

$$P = 0.05 = \frac{12 \text{ invalid probes a day} \times 6 \text{ min}}{240 \text{ all probes a day} \times 6 \text{ min}} = \frac{72 \text{ min a day}}{1440 \text{ min a day}}$$

where P represents an admissible 5% stochastic disutility (loss of quality) adopted here as a standard statistical limit.

4) Long-term sampling: this is a standard stochastic confidence sampling of approximately 120 hours/1200 probes, introduced here for process quality assessment/presentation; and 5) Four 6-hour data files per calendar day, providing a behavioristic control loop for process signal analysis and the presentation of communication interface logic in digital rectangular matrix standard format.

These digital indicators are 3-D (time-parametrical-probabilistic) behavioristic digital code/logic parameters for the standard software of the inventive control apparatus.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections througout;

FIG. 4 shows the standard output format (rectangular matrix) for process signal security criteria obtained by on-line inspection and/or end user feedback according to the principles of the present invention;

DETAILED DESCRIPTION OF A PREFERRED EMBODIMENT

Figure 1:
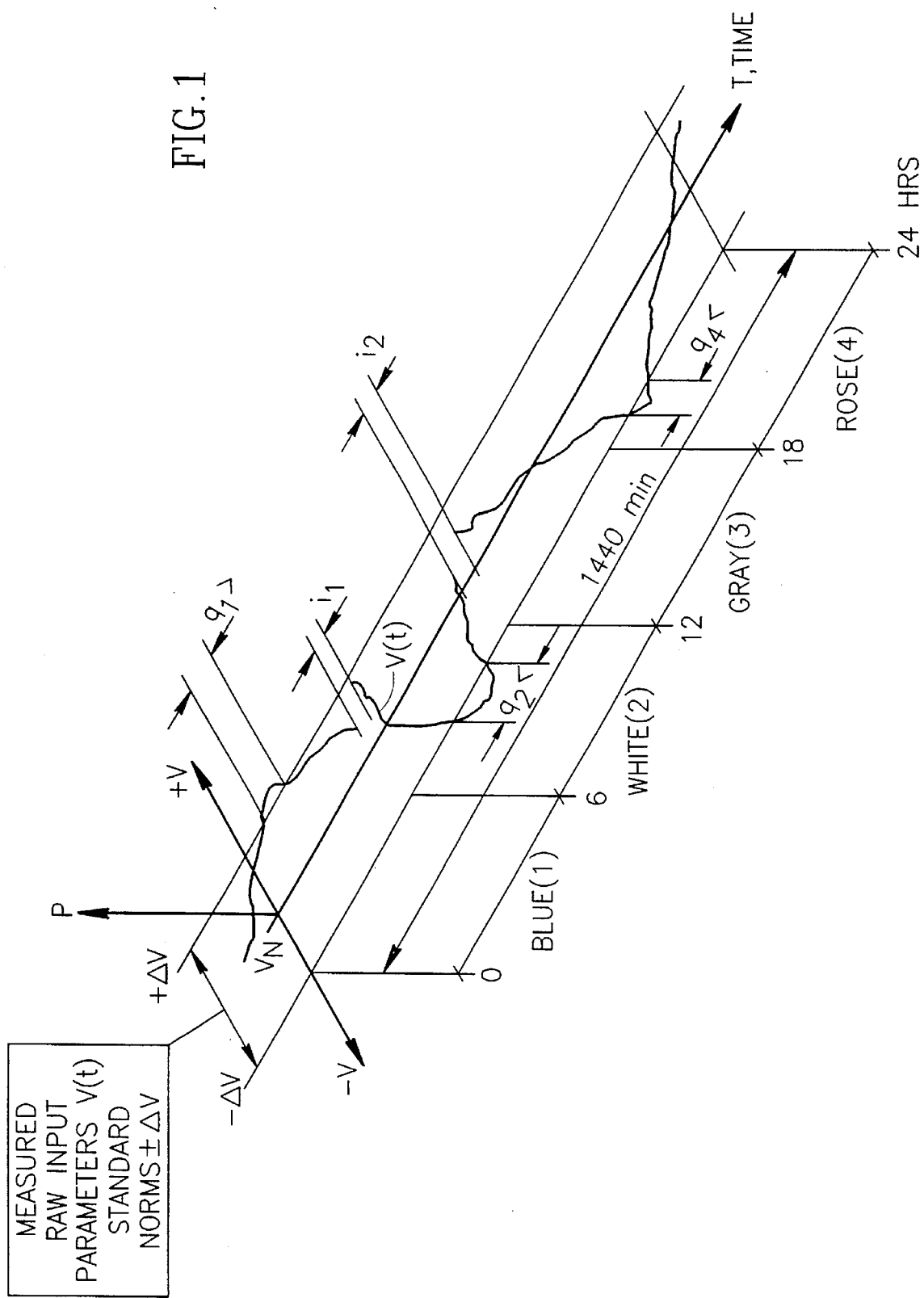
FIG. 1 illustrates a 3-D presentation of any stable recurrent stochastic signal V(t), representing two security criteria, within its parametrical steady-state tolerance rates (+/±V) and behavioristic control loop (calendar day)

FIG. 1 is a 3-D graphic illustration of a stable recurrent measured analog signal V(t) in a stochastic process during a calendar day, showing two security criteria presented in a time frame. The two security criteria are:

1) I-criterion (existence/reliability): $i_1, i_2, \ldots, i_n$— every current signal interruption of 1 sec or-more is represented;

2) Q-criterion (utility/quality): $q_1, q_2, \ldots, q_n$—every current 6-minute probe signal deviating beyond a standard tolerance range (+/±V) is represented (upper or lower limits).

FIG. 1 illustrates a security aspect of any measured stable analog signal which has an economic impact on process quality in accordance with the principles of the present invention. It shows the basic approach introduced here, using the mean value as the significant representation of process quality, and ignoring non-significant random fluctuations ("noise" problem) within the 5% statistical limit for the admissible loss of quality. This approach enables sliding mode inspection/on-line total quality control in the process/product functional activity as presented by the data acquisition subsystem.

Furthermore, FIG. 1 also demonstrates the general background for communication interface/protocol hand-shaking: the standard four 6-hour colored intervals/data files of the behavioristic control loop: blue, white, gray, rose.

The behavioristic distribution of two process security criteria on a time axis gives key dynamic information for on-line fast and certain process control, including financial claims/end user feedback and process discrete optimization programming.

Figure 2:
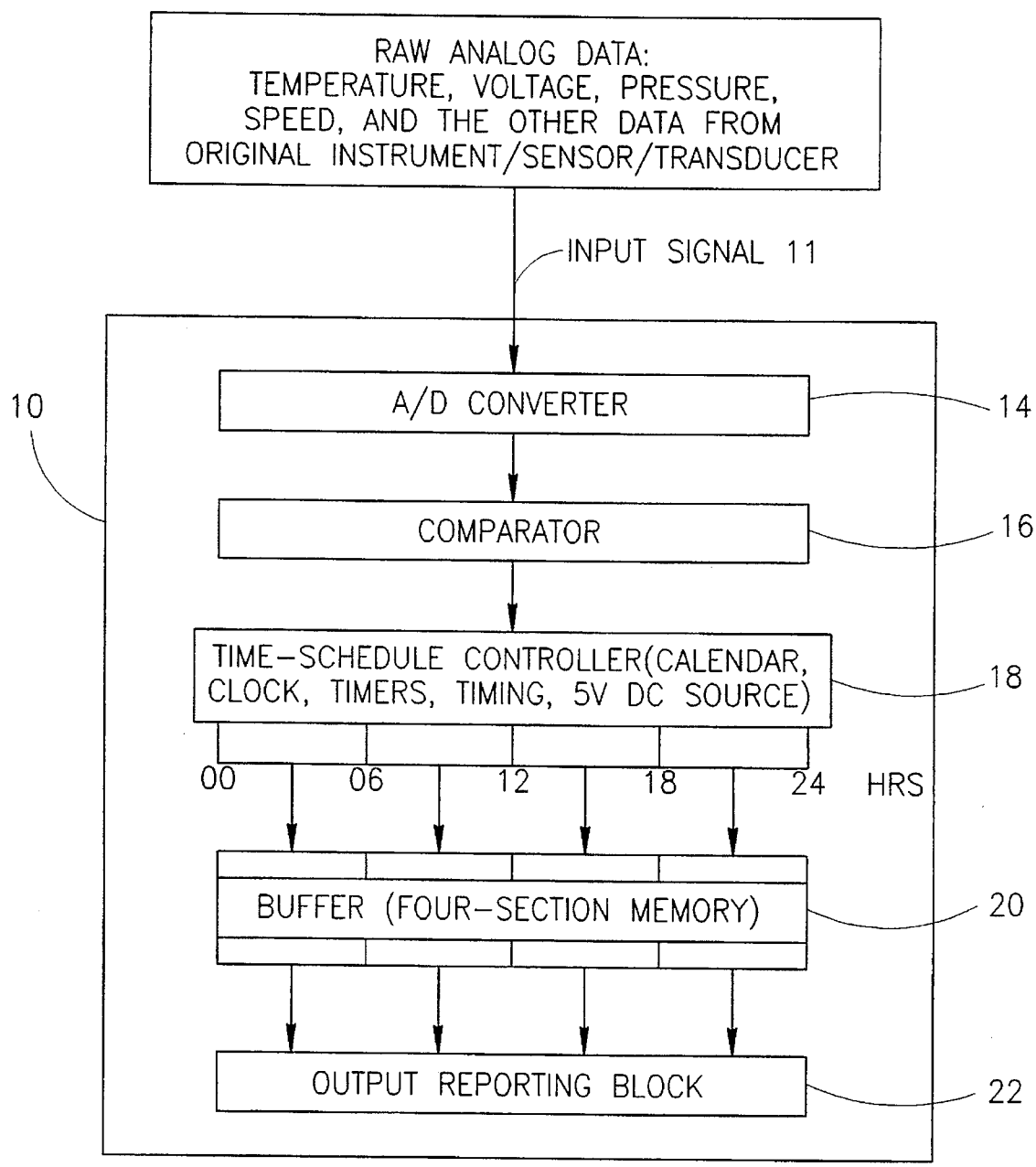
FIG. 2 is a block-diagram of a preferred micoprocessor-based embodiment of a control apparatus for processing variable analog parameters ( such as temperature, voltage, pressure, speed, radiation, vibration, etc.) constructed and operated in accordance with the principles of the present invention.

FIG. 2 is a block diagram of a preferred embodiment of a control apparatus 10 for digital processing of variable analog parameters, constructed and operated in accordance with the principles of the present invention. Control apparatus 10 is implemented as a dedicated, microprocessor-based controller which is functionally connected to a stationary or portable analog data sensor/measuring instrument, by means of electrical, electronic, fiber-optic, or any other short-distance transmission carrier which is capable of transferring data with acceptable accuracy (input signal 11 distance). The raw analog data itself can be presented, for example, by International SI basic and derived units, such as temperature, electricity (V, A), pressure, (atm, bar), speed (m/sec), rotational velocity (rev/sec), vibration (Hz), noise (dB), etc.

The block diagram of FIG. 2 comprises two hardware functional loops for presenting reliability and quality criteria:

1) The first functional loop monitors the I-criterion to determine if process interruptions exist: it operates on a trigger principle, or via a special timer within time-schedule block 18, and then in buffer 20, for periodical presentation in the output reporting module 22;

2) The second functional loop monitors the Q-criterion (converted to digital form via A/D converter, 14) and operates at 6-minute intervals between two takeoff probes; the raw digital data is fed to the comparator block, 16, which identifies every digit according to quality tolerance norms (+/−V adjustment range deviation) and indicates these deviations as more (>) or less (<) than the normal range.

An additional functional loop is general and provides tough stochastic decomposition of the input analog signal in accordance with a behavioristic control loop introduced here: predetermined 6-hour colored data files within every calendar day as a general communication interface principle, which are defined by a time-schedule block 18, comprising calendar, clock, two-level timer, timing synchronization, and 5 VDC independent power supply. Current I, Q-criteria data is stored in a four-section buffer block 20, in four disjoint 6-hour colored data files per day:

00:01–06:00 (night/blue);

06:01–12:00 (morning/white);

12:01–18:00 (day/gray);

18:01–24:00 (evening/rose).

The final output format can be adequately presented using the output reporting block 22 (printer/disk drive/transmission modules).

Figure 3:
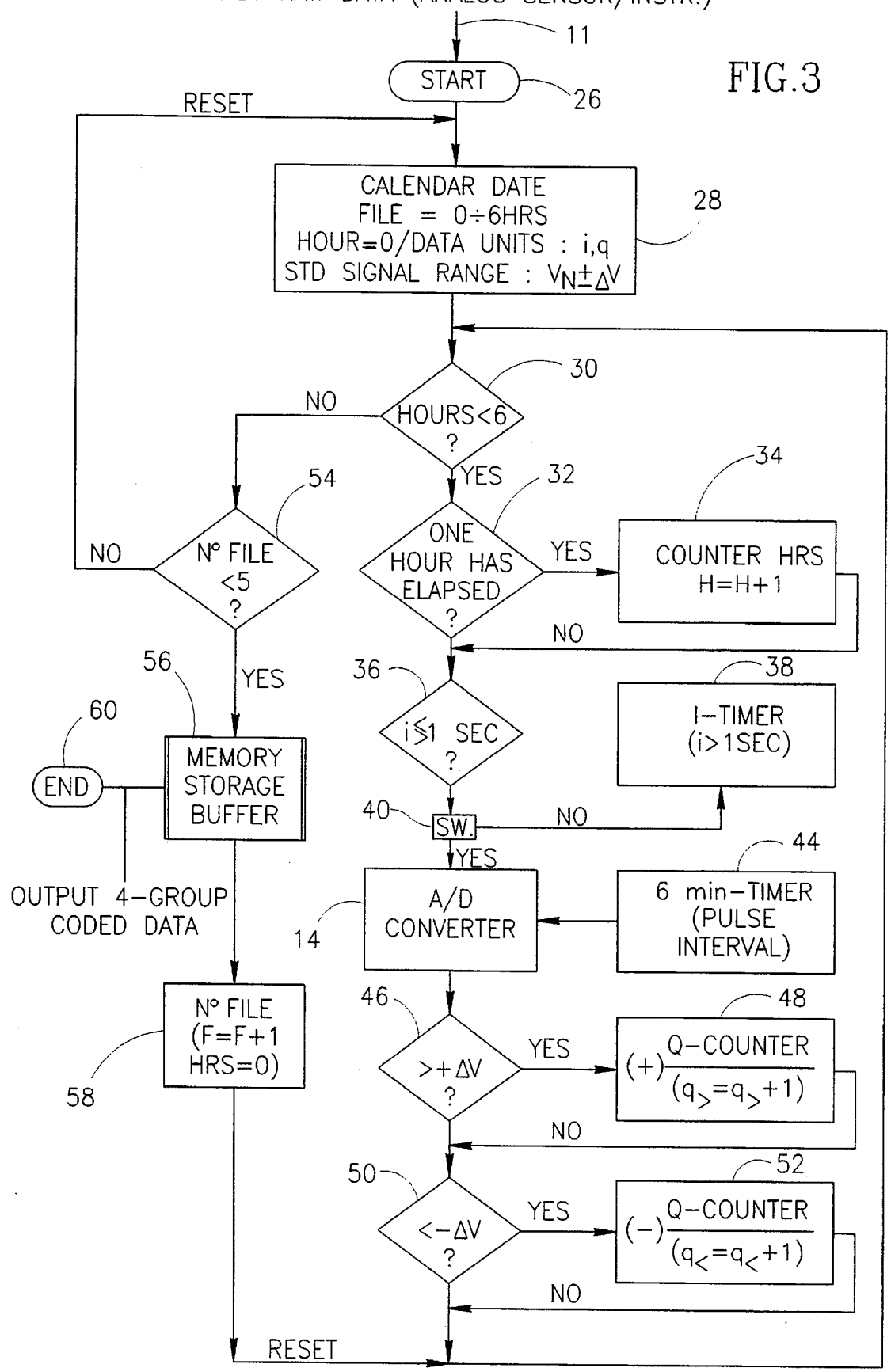
FIG. 3 is a sequential flowchart illustrating the operation of the control apparatus of FIG. 2, in which the standard software digital code parameters are used for output presentation.

FIG. 3 is a flowchart illustrating the operation of the security criteria data/feedback control apparatus in producing an output record which is based on sliding mode inspection of I and Q security criteria by operation of the hardware functional loops (FIG. 2 block diagram) during monitoring of the process shown in the format of FIG. 1. The raw input analog signal 11 is fed, via the start block 26, to the time-schedule block 28, which associates the calendar and clock time of input data 11, to the control of the process. In this way, current I, Q-criteria data is converted into a full digital presentation in a rectangular matrix format, which cannot be realized in a conventional analog control system.

The process continues in standard fashion, and analog data is analyzed four times a day during a predetermined 6-hour period in a behavioristic control loop, i.e., for each of the four time history files (blue, white, gray, rose). In block 30, the elapsed time is checked to determine if less than a 6-hour period has passed. If so, block 32 checks to determine if a one-hour interval has passed, in which case block 34 advances the counter by one hour. Whether or not one hour has passed, the current raw analog signal 11 is fed via block 36 and switch 40, to the I,Q security criteria functional loops for its presentation in digital output format.

Returning to the time schedule, if the elapsed time is greater than six hours, block 54 checks whether $N^o$ file is less than five, since one calendar day is represented by four 6-hour periods and accordingly, four output data groups per day. If the data file number is not less than 5, the sequence is reset, and the raw input data 11 of the next calendar day is received. If the data file number is less than 5, then block 54 supplies buffer 56, with the new input data portion at a storage address register for retrieval as output data in the form of printed or recorded information. Once this is done, the definite data file number is incremented in block 58, and the cycle is reset.

The I-criterion functional loop begins in block 36 and switch 40, and monitors analog signal V(t) via a standard trigger operation. When no signal exists, switch 40 causes I-timer 38 to register every V(t) interruption >1 sec and establishes the time units (sec., min., hrs.) which are accordingly stored in the general time-schedule buffer 56.

If switch 40 determines that there is no interruption, as should be the case in normal stable operation, the Q-criterion functional loop starts via the A/D converter The A/D converter 14 operates periodically in every 6-minute sampling interval as a takeoff probe by means of a 6-minute timer 44, which supplies a strict pulse for any stable recurrent analog signal, or 10/ten digital signals per hour. Thus, every six minutes a digital signal is fed, accordingly, to comparator blocks 46 and 50, for monitoring its value within the normal tolerance range (+/–V), in sequential order:

For counting of upper limit (>+ΔV) events (q>) by Q-counter 48, in every case of positive (+ΔV) deviation beyond the normal tolerance range;

For counting of lower limit (<–ΔV) events (q<) by Q-counter 52, in every case of negative (–ΔV) deviation beyond the normal tolerance range.

The q> and q< impulses (each one sequentially) are transmitted, stored and summed separately in buffer 56.

Thus, non-programmable standard digital software is achieved in a microprocessor-based data controller for the adequate on-line presentation of stable recurrent analog signal security.

The data files may be printed and marked in different colors to avoid identification error (blue, white, gray, rose). In the manufacturing process, control apparatus 10 can be used for sliding mode day-to-day security inspection, and/or for end user feedback on a periodical basis in a portable instrument during 1200 probes representing five days of sampling data.

In FIG. 4, a sample data printout is shown in a rectangular matrix digital format, which in coherent and flexible form illustrates the final output presentation of control apparatus 10. The format represents a valid, comprehensive document with a 3-D statistical analysis in digital form, which is accessible to the system operator for on-site analysis, i.e., for fast and certain decision-making. The printout format also represents silent documentation for financial claims in case of I- and/or Q-criteria disturbances and for communication/recording/programming procedures via output reporting block 22.

As mentioned above (Summary), commercial contract validity for both sides (supply and demand) of process security (reliability and quality) criteria deviation are digital data:

I: In time units (sec, min, hrs)—every interruption, i>1 sec;

Q: In sum (q>+q<)≧13 per calendar day (summing 1, 2, 3, 4 across a matrix format), per date, per line.

By establishing a price for each security criteria, commercial sanctions or a financial claim can be included terms of a commercial contract, depending on the "price" for customer/end user economic damage, per applicable tariff rates.

The data presented in FIG. 4 can be applied to utility distribution networks, and also to individual operating systems in appliance such as refrigerators, air conditioners, etc.

Figure 5:
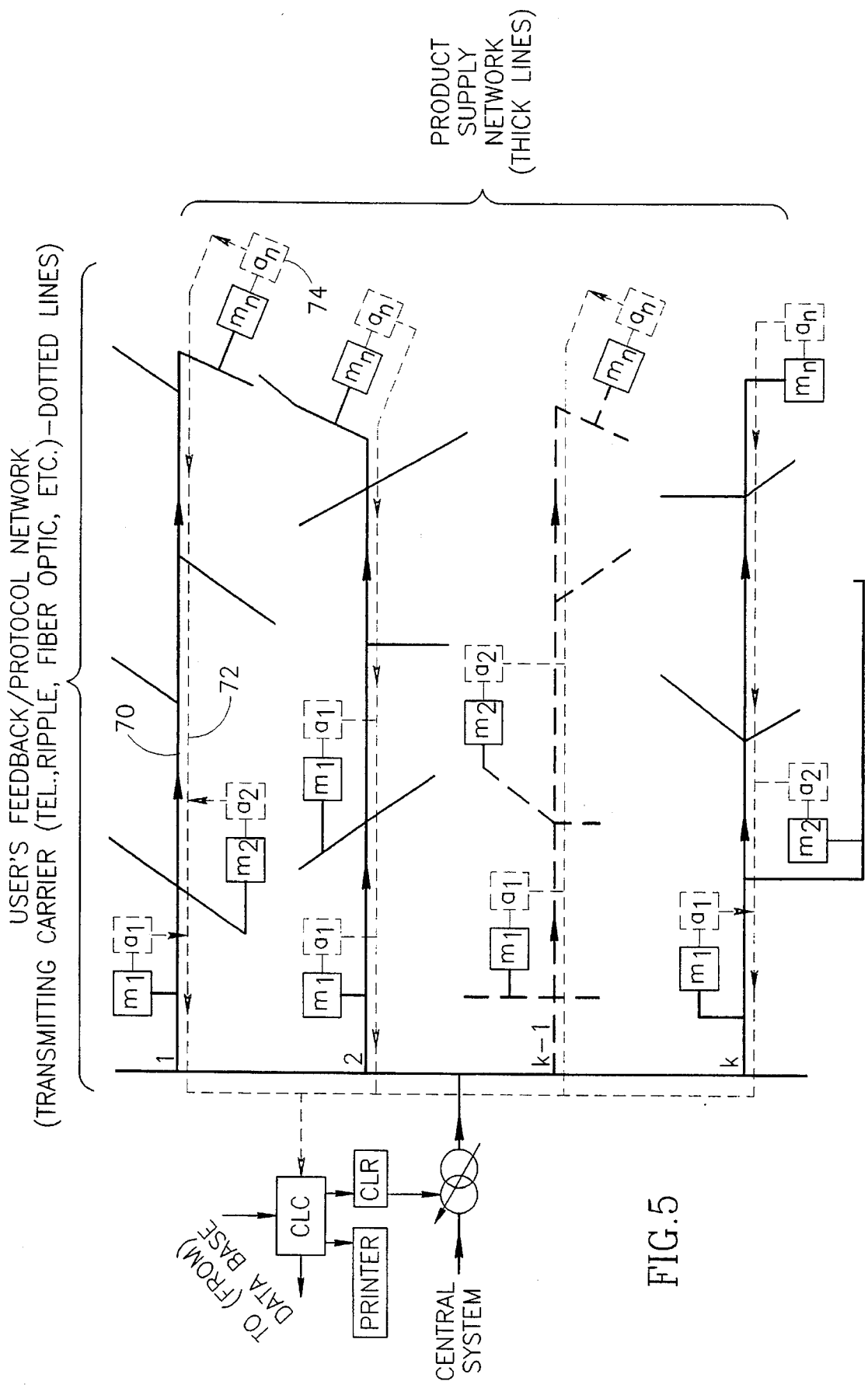
FIG. 5 illustrates a typical local distribution network of apparatus supplying two feedback functions, one utilized in process control and another for every end user's feedback in a centralized utility system (heating, gas, electrical etc.)

FIG. 5 shows an example of a supply-demand on-line statistical process control and management system, representing a centralized utility having a product supply network 70 (heating, gas, electricity, etc.). A plurality of control apparatus units 10 (a1, a2 . . . an) are provided at individual user locations, and each is shown connected to a commercial metering instrument (M1, M2 . . . Mn). Each control apparatus 10 is the basis for two basic feedback functions within the behavioristic control loop, in standard protocol format:

1) the first function provides optimal process control by providing control feedback via network 72 to a central local regulator (CLR) through a central local computer (CLC) per the format of FIG. 4, full automatic control is performed by comparison of two arithmetic sums q> and q< every 6 hours (separately) for five previous days. The sum (q>+q<) each day should be Y<12, which is adopted as a limit representing an admissible 5% stochastic loss of quality.

2) the second function is based on the sample data printout of FIG. 4, which represents every end user's commercial feedback by providing documentation of financial claims, and this information is fed using feedback network 72 to the central local computer (CLC), and it can be provided at the individual user locations (via output reporting block 22).

For example, an individual control apparatus 10 in user location 74 has a sample data printout (FIG. 4) which is associated with this location, and the reliability and quality data (I,Q criteria) for this location are presented in the sample data printout. Similarly, additional sample data printouts are associated with other user locations.

Thus, as shown in FIG. 5, a process control and management system using non-programmable standard digital software is achieved in a microprocessor-based data controller for the adequate on-line presentation of stable recurrent analog signal security. The system features sliding mode on-line inspection and diagnostics, with fast and accurate system updates.

Figure 6:
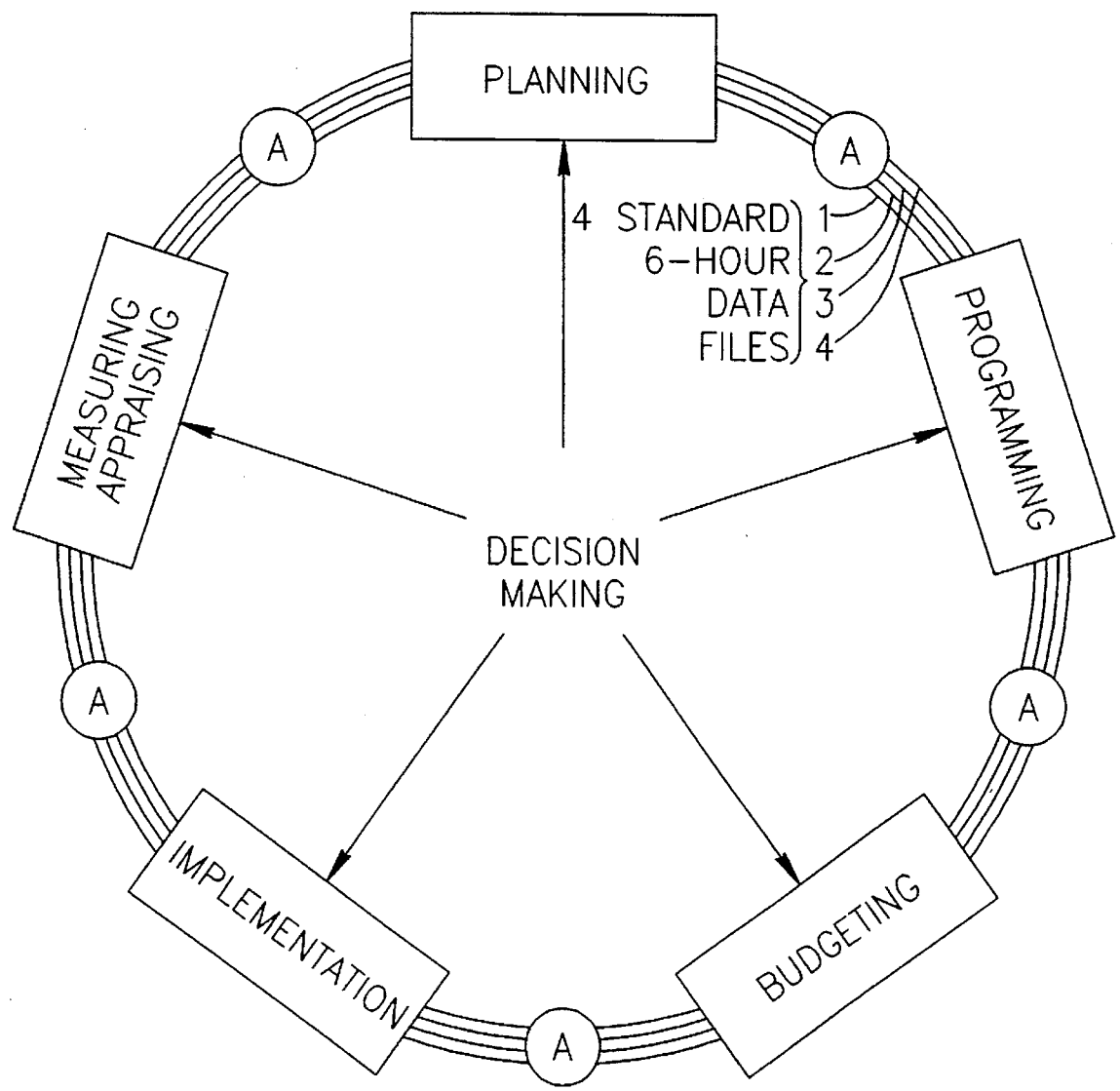
FIG. 6 is a schematic illustration of a business unit information system cycle for standard flexible analog output data provided by the control apparatus.

In FIG. 6, there is shown a schematic illustration of a business unit information system cycle. The system uses standard flexible analog output data, as a standard protocol model containing four time history data files as provided by control apparatus 10. This approach may include the use of a data highway on which qualitative analog data is transferable to various computer stations "A" for technological process analysis and decision-making.

It should be understood that the general idea of the present invention and its embodiments can be modified in minor detail (e.g., duration of statistical sample/calendar days for inspection). A variation includes adjustment of the valid signal tolerance range, regulating separately positive and negative deviation limits ($+/-V_N$).

Having described the invention with regard to certain specific embodiments thereof, it is to be understood that the description is not meant as a limitation, since further modifications may now suggest themselves to those skilled in the art, and it is intended to cover such modification as fall within the scope of the appended claims.

I claim:

1. A control apparatus for controlling a process by generating qualitative analog process security data feedback comprising:

timing means for defining four 6-hour daily periods;

instrumentation means for obtaining a first set of qualitative analog process data for use in generating signal security data feedback providing process reliability and process quality criteria;

means for sensing an interruption in continuity of said first set of obtained process data and determining an interval associated therewith, a plurality of said sensed interruption intervals defining I-criteria data representing said associated therewith, a plurality of said sensed process reliability criteria;

means for sampling said first set of obtained process data during each of said four 6-hour daily periods;

means for comparing said sampled first set of obtained process data with predetermined limit values defining a standard tolerance range, to determine deviations from said standard tolerance range, said deviations defining Q-criteria data representing said process quality criteria;

storage means for storing said I and Q criteria data in accordance with said four 6-hour daily periods, as time history files, wherein each of said time history files comprises a rectangular matrix containing four group coded values each corresponding to one of said four 6-hour daily periods; and means for transferring said I and Q criteria data in said time history files to a central local computer for performing optimal process control, said Q-criteria performing automatic process control In a central local regulator connected to said central local computer.

2. The control apparatus of claim 1 wherein said means for obtaining said qualitative analog process security data comprises instrumentation providing data in digital form including probabilistic Q-criteria data.

3. The control apparatus of claim 1 wherein said timing means, sensing comparing means are means, sampling and implemented by a microprocessor-based data input controller.

4. A method for controlling a process by generating qualitative analog process security data feedback comprising the steps of:

defining four 6-hour daily periods;

obtaining a first set of qualitative analog process data for use in generating signal security data feedback providing process reliability and process quality criteria;

sensing an Interruption in continuity of said first set of obtained process data and determining an interval associated therewith, a plurality of said sensed interruption intervals defining I-criteria data representing said process reliability criteria;

sampling said first set of obtained process data during each of said four 6-hour daily periods;

comparing said sampled first set of obtained process data with predetermined limit values defining a standard tolerance range, to determine deviations from said standard tolerance range, said deviations defining Q-criteria data representing said process quality criteria;

storing said I and Q criteria data In accordance with said four 6-hour daily periods, as time history files, wherein said storing step produces four of said time history files in accordance with said four 6-hour daily periods as follows:

00:01–06:00 (night);
   06:01–12:00 (morning);
   12:01–18:00 (day);
   18:01–24:00 (evening); and transferring said stored I and Q criteria data in said time history files to a central local computer for performing optimal process control, said Q-criteria performing automatic process control in a central local regulator connected to said central computer.

5. The method of claim 4 wherein each of said sensed interruptions comprises an interval of at least one second.

6. The method of claim 4 wherein said sampling step is performed every six minutes during said process.

7. The method of claim 4 wherein said transferring step includes printing said time history files as a rectangular matrix.

8. The method of claim 4 wherein said I-criteria data indicates process interruption of at least one second.

9. The method of claim 4 wherein said Q-criteria data further comprises a 0.95– probabilistic quantitative estimation of stable recurrent analog process quality based on the ratio between the sum of the time intervals during which deviations occur and the total sampling time intervals.

10. The method of claim 4 wherein said Q-criteria date indicates a sum of positive q> and q< impulses per calendar day representing the number of invalid probes beyond a predetermined steady-state standard tolerance range.

11. The method of claim 4 wherein said transferred time history files are provided in a distributed automation protocol, over a data highway to a plurality of computing stations for performing, at least at one of said computing stations, at least one of the tasks of technological process control analyis and decision-making.

* * * * *